UNITED STATES PATENT OFFICE.

RICHARD LEWIS, OF NORRISTOWN, PENNSYLVANIA.

MANUFACTURE OF TERNE PLATES.

SPECIFICATION forming part of Letters Patent No. 584,692, dated June 15, 1897.

Application filed May 9, 1896. Serial No. 590,937. (No specimens.)

*To all whom it may concern:*

Be it known that I, RICHARD LEWIS, of Norristown, in the county of Montgomery and State of Pennsylvania, have invented certain new and useful Improvements in the Treatment or Manufacture of Terne Plates; and I do hereby declare the following to be a full, clear, and exact description of the invention, such as will enable others skilled in the art to which it pertains to make and use it.

My invention has relation to the treatment or manufacture of tin and terne plates; and it pertains to the final steps in the process, whereby an improved plate is produced which will not show upon its surface the imperfections of the plate and which is not subject to sweating, discoloration, or rust, all of which are of common occurrence in the terne plates as now manufactured.

In the usual method of manufacturing tin and terne plates they are taken from the machine with the tin in a liquid or molten state and allowed to "set" in the presence of the atmosphere. By this method the imperfections of the plate show upon its surface with greater distinction than on the original plate and the plates are subject to sweating, discoloration, and the showing of rust, which causes many annoying complaints to manufacturers.

The object of my present invention is to overcome all these defects in a very simple, inexpensive, and yet effective and permanent manner.

The main idea of my invention is the taking of the plate with the metal in a liquid or molten state as it comes from any tinning-machine and subjecting it to a "setting-bath" composed of an oil. I find that if the plate is so treated when in a liquid state any defects upon the surface of the plate will be covered and the surface shows up a smooth and even sheet. For instance, if an imperfect plate with a rough or streaky surface is passed through molten metal and allowed to set in the presence of the atmosphere, as usual, it will be found when firmly set to show up all of the defects in an exaggerated manner and with greater distinction than on the surface of the imperfect plate itself. On the other hand, if the imperfect plate is passed through molten metal and while the metal is in a liquid state it is plunged into a setting-bath, according to my invention, all these defects are covered and the surface of the plate will be perfectly smooth and the imperfections all covered. This is caused by no time being allowed for the liquid metal to set in the atmosphere, but rather is compelled to at once set, and evenly, by being plunged into a setting-bath of any certain composition.

The setting-bath which best serves my purposes consists of an oil compounded, preferably, of olive, linseed, petroleum, and palm oils in equal proportions.

The object of the oil-bath is to prevent rust, sweat, and discoloration breaking out, but the main object of my invention is the plunging of the plate or the subjection of the plate while the metal is in a liquid state to a setting-bath.

The setting-bath is preferably tepid, so that the change is not too sudden.

Having thus described my invention, what I claim, and desire to secure by Letters Patent, is—

1. In the manufacture of tin and terne plates the subjection of the plate while the metal is in a liquid state to an oil setting-bath composed of olive, linseed, petroleum and palm oils, for the purposes described.

2. The art of coating terne plates which consists in coating the plate by dipping it in liquid metal, and then subjecting the plate to an oil setting-bath of a temperature below the melting-point of the liquid coating, whereby the coating is flowed smoothly over the entire surface, and an oil-finish obtained for the purpose described.

In testimony whereof I affix my signature in presence of two witnesses.

RICHARD LEWIS.

Witnesses:
W. A. SISSON,
EUGENE D. EGBERT.